United States Patent [19]

Leonard

[11] Patent Number: 4,681,371
[45] Date of Patent: Jul. 21, 1987

[54] AUXILIARY DUMPING APPARATUS FOR VEHICLES

[76] Inventor: Daniel F. Leonard, 612 J Ave., National City, Calif. 92050

[21] Appl. No.: 766,141

[22] Filed: Aug. 16, 1985

[51] Int. Cl.4 .............................................. B60P 1/64
[52] U.S. Cl. .................................... 298/1 A; 224/310; 296/10; 296/26; 298/12; 414/522; 414/523
[58] Field of Search ................... 298/1 A, 12; 296/10, 296/26, 35.3; 414/498, 522, 523; 224/310

[56] References Cited

U.S. PATENT DOCUMENTS

| | | | |
|---|---|---|---|
| 3,055,709 | 9/1962 | Kirkwood | 298/1 A |
| 3,147,999 | 9/1964 | Daniels | 298/1 A |
| 3,630,571 | 12/1971 | Saldana | 298/1 A X |
| 4,084,851 | 4/1978 | Duncan, Sr. | 298/1 A X |
| 4,249,295 | 2/1981 | Lance | 296/10 X |

*Primary Examiner*—Robert J. Spar
*Assistant Examiner*—Janice Krizek
*Attorney, Agent, or Firm*—Charmasson & Holz

[57] ABSTRACT

A dumper of the type that attaches to the bed of a pick-up, trailer or the like, and adds the dumping feature to the fixed-bed locomotive, and comprises a bin riding over a set of rollers secured to a framework affixed to the bottom of the pick-up bed.

7 Claims, 12 Drawing Figures

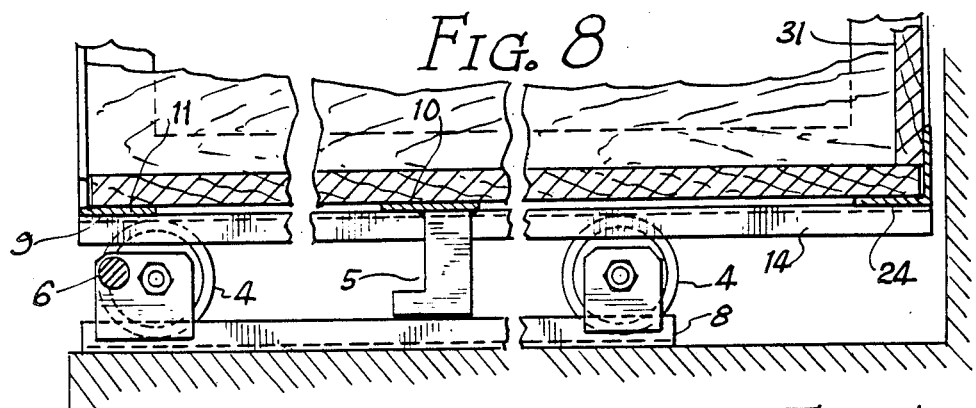
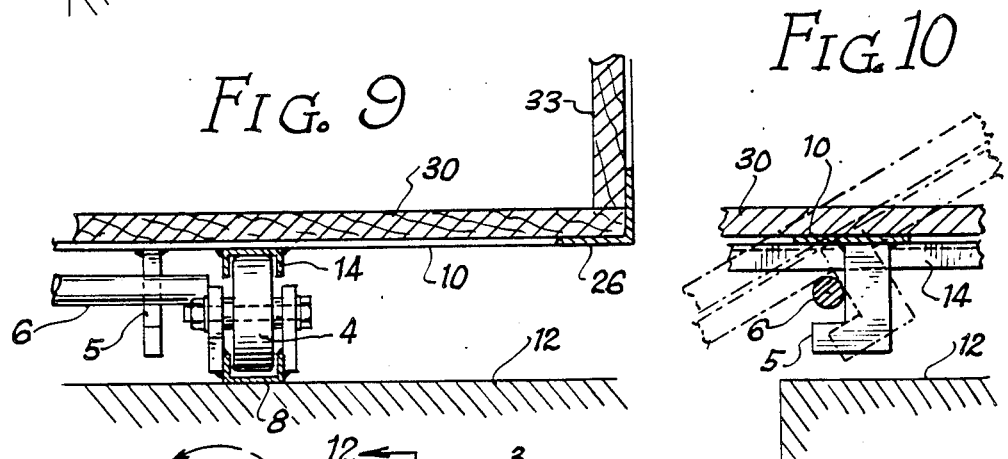
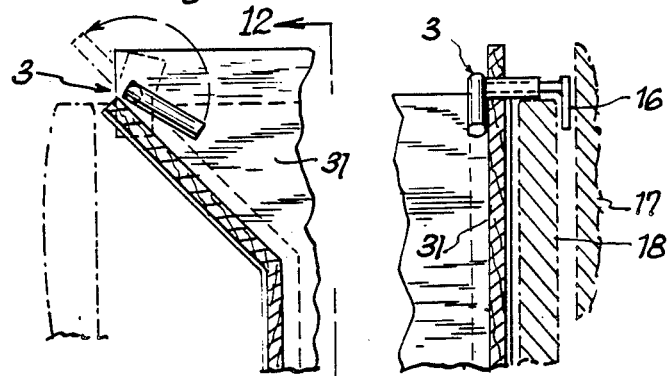

AUXILIARY DUMPING APPARATUS FOR VEHICLES

BACKGROUND OF THE INVENTION

The present invention relates to a detachable dumper assembly used in combination with the fixed-bed of a pick-up trailer or the like.

Typically, a fixed-bed locomotive cannot be used as a dumper. Wherefore, the owner had to resort to the use of another dumper-locomotive, which increases the cost of operations.

Thus there is a need for a dumper assembly which could be detachably attached to the fixed-bed, to add the dumping feature to the fixed-bed trucks.

SUMMARY OF THE INVENTION

It is the primary object of the present invention to provide a dumper assembly which is attached to the fixed-bed of a locomotive, to provide the additional dumping feature.

It is another object of the present invention to provide an easily detachable dumper assembly, wherein no permanently attaching device is used.

It is yet a further object of the present invention to reduce or eliminate the cost and inconvenience of using an additional locomotive with dumping facilities.

These and other objects are achieved by means of a removable bin riding on a set of rollers secured to a framework affixed to the bottom of a pick-up bed.

BRIEF DESCRIPTION OF THE DRAWINGS

FIG. 8 is a cross-sectional side view of the dumper showing the hook, hook-stop and rollers:

FIG. 9 is a cross-sectional front view of the hook, hook-stop and rollers;

FIG. 10 is a cross sectional side view of the hook after engagement with hook-stop;

FIG. 11 is a cross-sectional side view of the latch and front end of the dumper; and FIG. 12 is a cross-sectional side view of the latch in a locking position.

DESCRIPTION OF THE PREFERRED EMBODIMENT OF THE INVENTION

Figure 1:
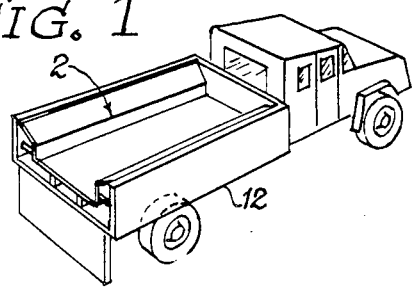
FIG. 1 is a perspective view of the dumper mounted on the bed of a pick-up.

The dumper illustrated in the drawings comprises a framework 1, a bin 2, a pair of latches 3, rollers 4, a pair of hooks 5, a rod 6 and a pair of handles 7.

Figure 6:
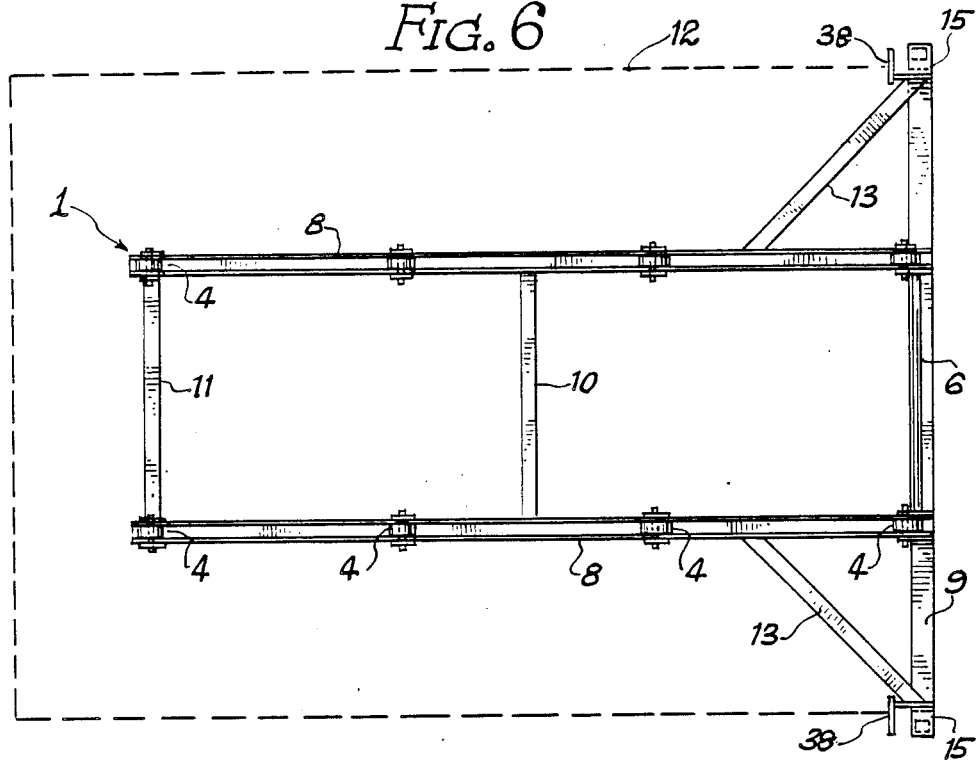
FIG. 6 is a top plan view of the framework.

As illustrated in FIG. 6, the framework 1 comprises a pair of longitudinal tracks 8; one long arm 9 located orthogonally to and coplanarly with the longitudinal tracks 8; and two shorter arms 10 and 11, parallel to arm 9.

Arm 9 is mounted at the rear end of the truck bed 12. Arm 10 is mounted at the middle of the tracks 8. Arm 11 is mounted at the front end of the tracks 8.

The framework 1 is removably secured to the truck bed 12, by either bolting the whole framework 1 down to the bed 12, or by bolting down the long arm 9 to the bed and by connecting the arm 9 to the tracks 8 by means of two side arms 13. A more convenient method of attachment will be explained below, using the fingers 20 mounted on the end of the upright members 19.

Figure 4:
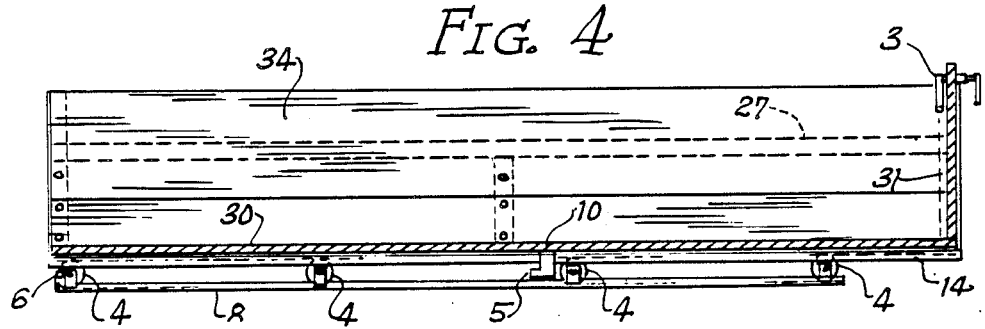
FIG. 4 is a cross-sectional side view of the dumper.

As illustrated in FIGS. 3, 4, 5, 8, 9 and 10, the tiltable bin 2 is slidingly mounted on the framework 1. FIGS. 4 and 6 show four rollers 4 mounted on each track 8, and equally spaced, which support the under-side of the bin 2. The bin 2 is made of plywood pressed on a metal frame.

FIGS. 4, 5, 8 and 9 illustrate the use of two parallel tracks 14 affixed to the underside of the bin 2. These tracks 14 are mounted on the rollers 4 and serve at least two purposes. The first is to prevent the bin 2 from sliding sideways, and the second is to route the rollers 4.

The pivoting feature of the bin 2 is shown in FIGS. 8, 9 and 10. Such featue is provided by means of two hooks 5 and a hook stop or rod 6.

The hooks 5 are mounted on the underside of the bin 2, in the inner space between the two parallel tracks 14. The hooks 5 are equally spaced to the tracks 14. The hooks are located only inches away from the center of gravity of the bin 2, toward the front end of said bin 2.

The hook stop or rod 6 is mounted at the rear end of the longitudinal tracks 8, and transversally spans between these tracks 8.

Two handles 7 are mounted on the rear end of each side of the bin 2. When the workman wishes to use the bin 2 as a dumper, he exerts a horizontal force on the handles 7. Such force will cause the bin 2 to move along the longitudinal tracks 8 while being routed by the rollers 4.

When the center of gravity of the bin is off the truck bed 12, the hooks 5 engage the rod 6. At which point, the weight of the bin 2 forces its back end to tilt downward, while the hooks 5 provide support to the tilted bin 2, and prevent it from getting completely disengaged from the framework 1 and the truck bed 12.

When the dumper is not in use, the bin 2 is locked to the truck bed 12 by means of a pair of latches 3.

As illustrated in FIGS. 11 and 12, the latches 3 are rotationally mobile in a plane orthogonal to that of the framework 1. When the bin 1 is to be locked to the truck bed 12, the two latches 3 are turned counter-clockwise and clockwise respectively, such that the end member 16 of each latch 3 locks between the cap body 17 and the truck body 18.

Figure 5:
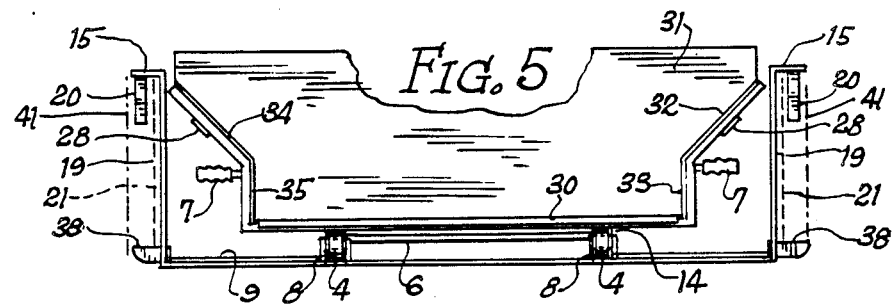
FIG. 5 is a rear view of the dumper.

FIG. 5 shows two engagement members 15, affixed to and located at the rear end of the framework 1. Each member 15 comprises an upright member 19, a finger 20 secured to the upper end of said upright member 19 and a stopper 38. These enagement members 15 provide an additional and optional means for securing the framework 1 to the truck bed 12. This purpose is accomplished by engaging the rear vertical ends 21 of the truck bed 12 between the upright members 19 and the fingers 20. The stopper 38 acts against the jamb 39 of the tail gate 40.

In a large number of pick-ups the rear end of each bed side member 12 is provided with a channel 41 made from a section of square tubing (shown in dotted line on FIG. 5) for mounting side extensions. In such cases, the fingers 20 can be inserted into the channels 37 to provide a more secure attachment of the frame to the bed 12.

Figure 2:
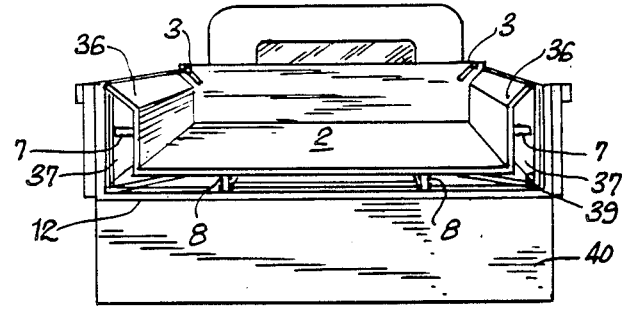
FIG. 2 is a rear view of the dumper in FIG. 1.
Figure 3:
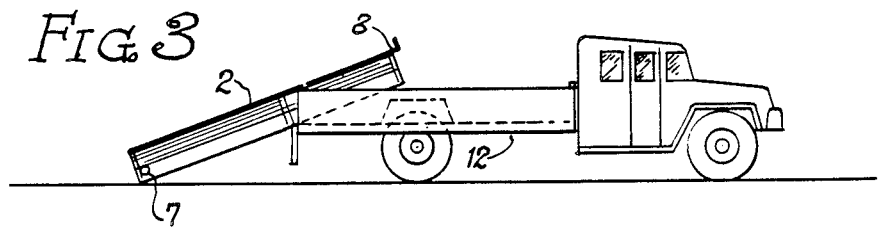
FIG. 3 is a side view of the dumper in actual use.
Figure 7:
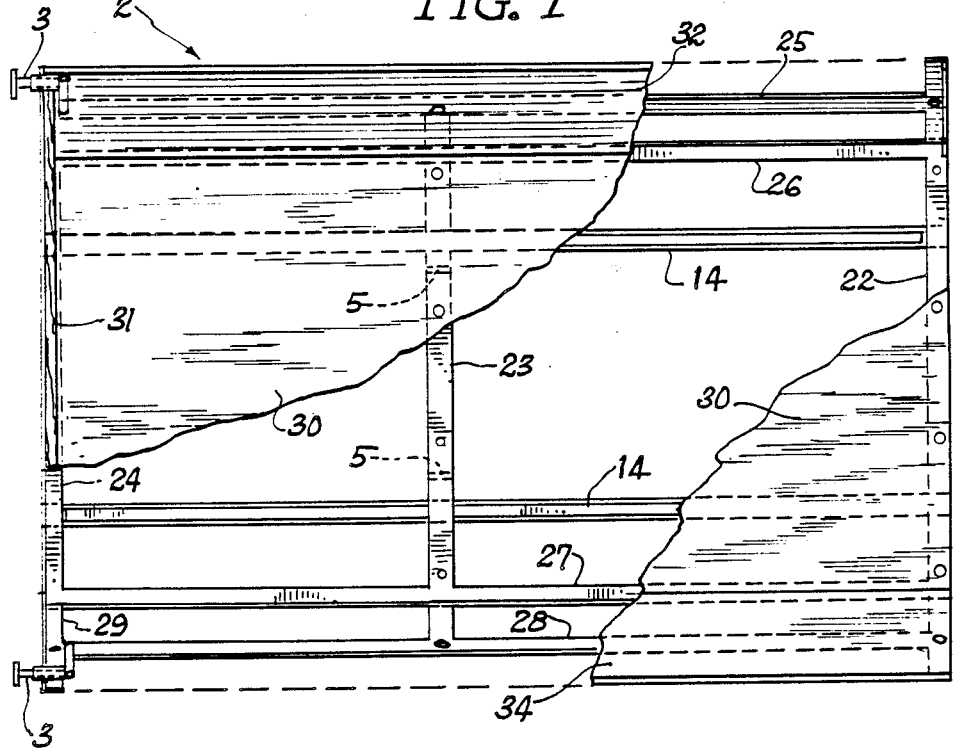
FIG. 7 is a partial cross-sectional top view of the dumper.

As illustrated in FIG. 7 the metal frame of the bin 2 comprises two flat beams 22, 23 and one beam 24 made of angle iron; which beams are spanned by a series of longitudinal rib members 25, 26, 27, 28 and a beam 29 which defines the upper edge of the bin front face. Plywood panels 30, 31, 32, 33, 34 and 35 line the inside of the frame 2 and tracks 14 are welded to its underside. The upper edge of the bin lateral walls defines two slanted flanges 36 which, as shown in FIG. 2, meet the top edges of the pick-up bed. The flanges 36 prevent material being loaded into the bin 2 from falling between the respective walls of the bin and pick-up bed. The space 37 under the flanges 36 provide clearance for the handles 7 and a convenient area for storing picks, shovels and other tools.

While the invention has been described in connection with a preferred embodiment, it is understood that the alternatives, modifications and improvements may be apparent to those skilled in the art in view of the foregoing description. Those modifications, alternatives and improvements therefore fall within the spirit and scope of the appended claims.

What is claimed is:

1. In combination with the bed of a pick-up, trailer or the like which is flanked by lateral walls terminated at their rear ends by a pair of tail-gate jamb elements forming two vertical post-mounting channels, an auxiliary dumping apparatus comprising:

a framework consisting essentially of a pair of longitudinal tracks laid against said bed, a plurality of cross-members placed and dimensioned to keep said tracks in a parallel and spaced-apart relationship, one of said cross-members comprising one arm orthogonally and coplanarly located with respect to the longitudinal tracks along the rear edge of the bed between said jamb elements, a pair of upright members extending from the respective ends of said orthogonal arm alongside and commensurate with said jamb members, a pair of L-shaped fingers respectively secured to the upper ends of said upright members and shaped and dimensioned for engagement into the two post-mounting channels, and a pair of extensions at the respective ends of said orthogonal arm, said extensions projecting into the corners formed by the inner sides of said jamb elements and said lateral walls;

a tiltable bin slidingly mounted on said tracks;

means for locking said bin over the bed;

means for moving the bin longitudinally along said tracks until the center of gravity of the bin is off said bed; and pivoting means transversally mounted at the rear end of said tracks for tilting the bin beyond the back end of the bed.

2. The apparatus of claim 1, wherein the means for locking said bin comprises at least one latch affixed to the front end of the bin, and having one end member which locks a part of said bed.

3. The apparatus of claim 2, wherein the means for moving the bin comprises:

at least two rollers mounted at spaced-apart locations along the longitudinal tracks and supporting the underside of the bin.

4. The apparatus of claim 3 wherein said pivoting means comprises:

two hooks secured to the outer side of the base of said bin; and means mounted at the rear end of said tracks for engaging said hooks and stopping the rearward movement of the bin.

5. The apparatus of claim 3 wherein said bin comprises a pair of parallel tracks affixed to said underside and routing said rollers.

6. The apparatus of claim 4 wherein said means for engaging comprises a rod transversally spanning said tracks.

7. The apparatus of claim 6 wherein said means for moving further comprises two handles dorsally mounted at the rear end of said bin.

* * * * *